United States Patent
Parrish (10) Patent No.: US 9,434,584 B2
(45) Date of Patent: Sep. 6, 2016

(54) RACK APPARATUS

(71) Applicant: Stephen Eugene Parrish, Antwerp, OH (US)

(72) Inventor: Stephen Eugene Parrish, Antwerp, OH (US)

(73) Assignee: Parrish Products, LLC, Antwerp, OH (US)

( * ) Notice: Subject to any disclaimer, the term of this patent is extended or adjusted under 35 U.S.C. 154(b) by 1 day.

(21) Appl. No.: 14/459,297

(22) Filed: Aug. 13, 2014

(65) Prior Publication Data

US 2015/0050117 A1   Feb. 19, 2015

Related U.S. Application Data

(60) Provisional application No. 61/866,486, filed on Aug. 15, 2013.

(51) Int. Cl.
| | |
|---|---|
| B66F 9/06 | (2006.01) |
| B25H 3/04 | (2006.01) |
| B29D 30/00 | (2006.01) |
| B66F 9/14 | (2006.01) |
| B66F 9/18 | (2006.01) |
| B60B 30/04 | (2006.01) |

(52) U.S. Cl.
CPC . B66F 9/06 (2013.01); B25H 3/04 (2013.01); B29D 30/0016 (2013.01); B66F 9/142 (2013.01); B66F 9/18 (2013.01); B29D 2030/0027 (2013.01); B60B 30/04 (2013.01)

(58) Field of Classification Search
CPC ............ A47F 7/04; B66F 9/06; B66F 9/142; B66F 9/127; B66F 9/18; B29D 30/0016; B29D 2030/0027; B25H 3/04; B60B 30/04
USPC ............ 414/267, 623, 608, 800; 211/23, 24
See application file for complete search history.

(56) References Cited

U.S. PATENT DOCUMENTS

| | | | | |
|---|---|---|---|---|
| 3,147,864 | A * | 9/1964 | Sylvester | 211/24 |
| 3,393,807 | A * | 7/1968 | Sylvester | 211/24 |
| 3,700,113 | A * | 10/1972 | Hager | A47F 7/04 211/23 |
| 3,812,974 | A * | 5/1974 | Sylvester | 211/23 |
| 3,935,948 | A * | 2/1976 | Podojil | B29D 30/0016 211/23 |
| 4,261,470 | A * | 4/1981 | Dolan | 211/191 |
| 4,290,370 | A * | 9/1981 | Gallagher et al. | 108/53.5 |
| 4,444,323 | A * | 4/1984 | Travis | A47B 57/52 108/108 |
| 4,714,169 | A * | 12/1987 | Keenan et al. | 220/8 |
| 5,259,325 | A * | 11/1993 | Pilger | 108/55.1 |
| 5,340,268 | A * | 8/1994 | Dowty | 414/622 |
| 5,348,149 | A | 9/1994 | McCarthy | |
| 6,422,405 | B1 * | 7/2002 | Haenszel | 211/175 |
| 7,802,526 | B2 * | 9/2010 | Brady et al. | 108/53.5 |

\* cited by examiner

*Primary Examiner* — Dean Kramer
(74) *Attorney, Agent, or Firm* — Brenda J. Kruse (57) ABSTRACT

A rack apparatus for tire rings includes a base having a rigid frame coupled thereto. The base includes a plurality of spaced apart members configured to receive manipulating components of a material handling device for transportation to a desired location. The frame is coupled to the base and includes a plurality of receiving members configured to removably receive at least one tire ring thereon.

17 Claims, 6 Drawing Sheets

RACK APPARATUS

CROSS REFERENCE TO RELATED APPLICATIONS

This application is entitled to claim the benefit of, and claims priority to, U.S. provisional patent application Ser. No. 61/866,486 filed Aug. 15, 2013, the entire disclosure of which is incorporated herein by reference.

FIELD OF THE INVENTION

The present invention relates generally to a rack apparatus and, more particularly, to a rack apparatus configured to releasably support and transport at least one tire ring.

BACKGROUND OF THE INVENTION

Tire rings are commonly used to hold down a material covering for agricultural, wood, and aggregate products. The tire rings are also used as base weights for construction barricades in construction zones. Typically, the tire rings weigh a certain amount (i.e. 23-27 lbs.) to secure the material covering, yet are easy to handle. In use, the tire rings are distributed generally evenly on top of the material covering or positioned at a base of the construction barricades. To access the product under the material covering or upon completion of the construction project, the tire rings need to be removed. Presently, the tire rings are removed, collected, and stored in an unsightly, disorganized pile. The pile of tire rings permits water to pool and become stagnate, which provides a breeding ground for mosquitoes and other disease carrying insects. The pile of tire rings also provides a place for rodents to nest.

Furthermore, the tire rings are typically reused repeatedly to hold down the material covering and for numerous construction projects. To reuse the tire rings, however, the tire rings need to be removed from the disorganized pile. Because the tire rings are haphazardly stored in the pile, the time and effort to gather and organize the tire rings for reuse is long and arduous.

Accordingly, it would be desirable to produce a rack apparatus which is configured to releasably support and transport at least one tire ring, wherein a structural complexity and cost thereof are minimized.

SUMMARY OF THE INVENTION

In concordance and agreement with the present disclosure, a rack apparatus which is configured to releasably support and transport at least one tire ring, wherein a structural complexity and cost thereof are minimized, has surprisingly been discovered. The rack apparatus is structured to include a base and a rigid frame having open areas generally accessible for insertion and removal of the tire rings from the sides of the rack apparatus. The dimensions of the frame are selected with respect to a width, a height, and a stack height of the tire rings and further with respect to a width of a manipulating component of the material handling device. Generally, the manipulating component will be forks of a forklift truck.

A substantial savings is realized in labor requirements otherwise required for removal and reuse of the tire rings. In this regard, the tire rings are loaded on the rack apparatus, which can be transported directly to a desired location, and are removed directly from the rack apparatus by the material handling device. Thus, the labor required in gathering and organizing the tire rings for reuse is minimized. Counting of the tire rings is also greatly simplified in as much as a predetermined number of the tire rings can be disposed on each of the receiving members. Additionally, the hazards associated with disease carrying insects and rodents are also minimized.

In one embodiment, a rack apparatus, comprises: a base including a plurality of elongate members; and a frame coupled to the base, the frame including at least one receiving member configured to removably receive at least one tire ring thereon.

In another embodiment, a rack apparatus, comprises: a base including a plurality of spaced apart elongate members, wherein each of the elongate members is configured to cooperate with a manipulating component of a material handling device; and a frame coupled to the base, wherein the frame includes at least one stanchion having at least one receiving member disposed thereon, the at least one receiving member configured to removably receive at least one tire ring thereon, and wherein the frame is configured to receive another rack apparatus thereon in stacked relationship.

In yet another embodiment, a method of transporting a tire ring, comprises the steps of: providing a rack apparatus including a base having a plurality of elongate members and a frame coupled to the base, wherein the frame includes at least one receiving member configured to removably receive the tire ring thereon; and causing the rack apparatus to move from a first desired position to a second desired position using a material handling device.

BRIEF DESCRIPTION OF THE DRAWINGS

The above, as well as other objects and advantages of the invention, will become readily apparent to those skilled in the art from a reading of the following detailed description of the invention when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

FIGS. 1-3, 5, and 7 depict a rack apparatus 10 according to the present invention. The rack apparatus 10 can be used to releasably support and transport at least one tire ring 12

Figure 1:
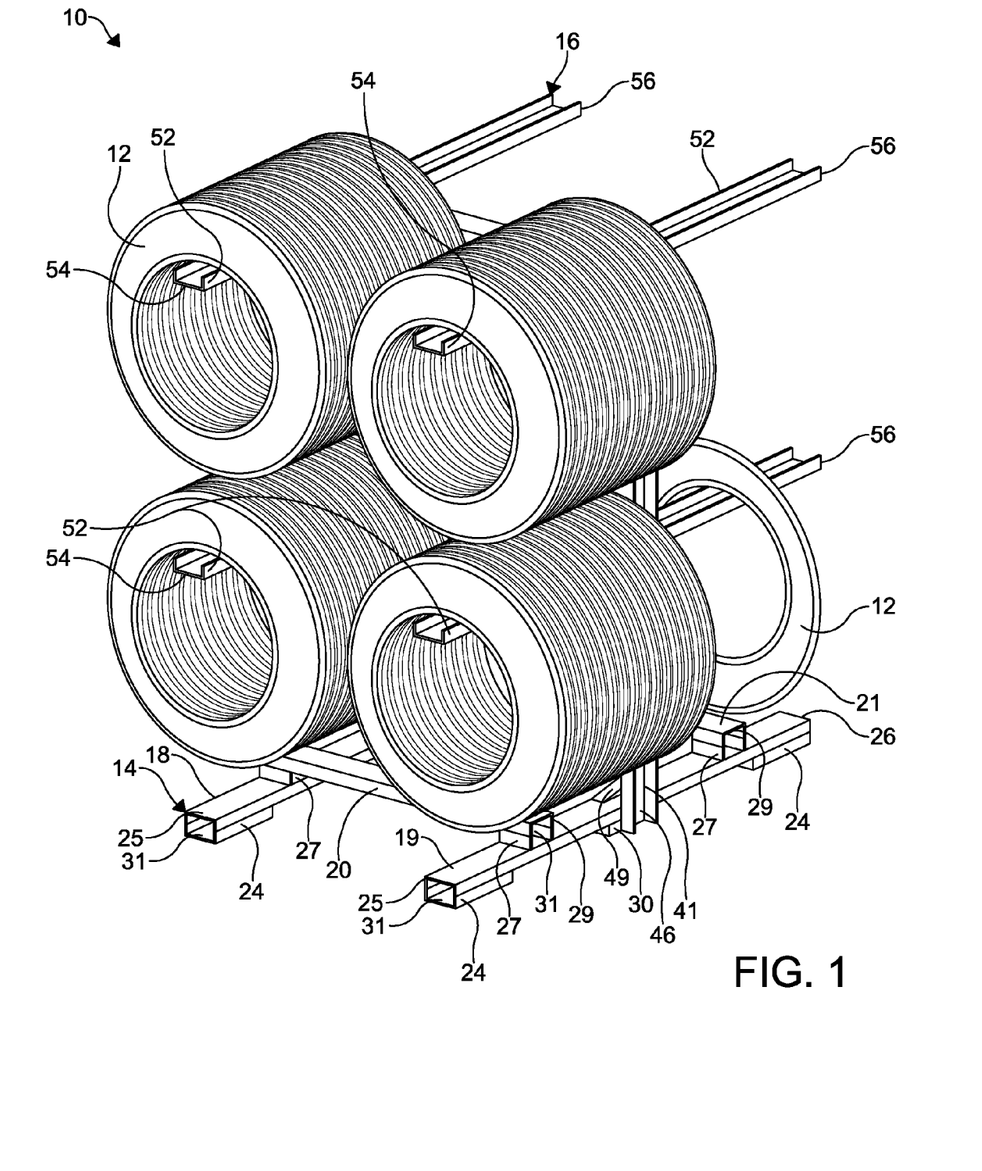
FIG. 1 is a perspective view of a rack apparatus according to an embodiment of the present invention, wherein a plurality of tire rings are disposed on receiving members of the rack apparatus.
Figure 2:
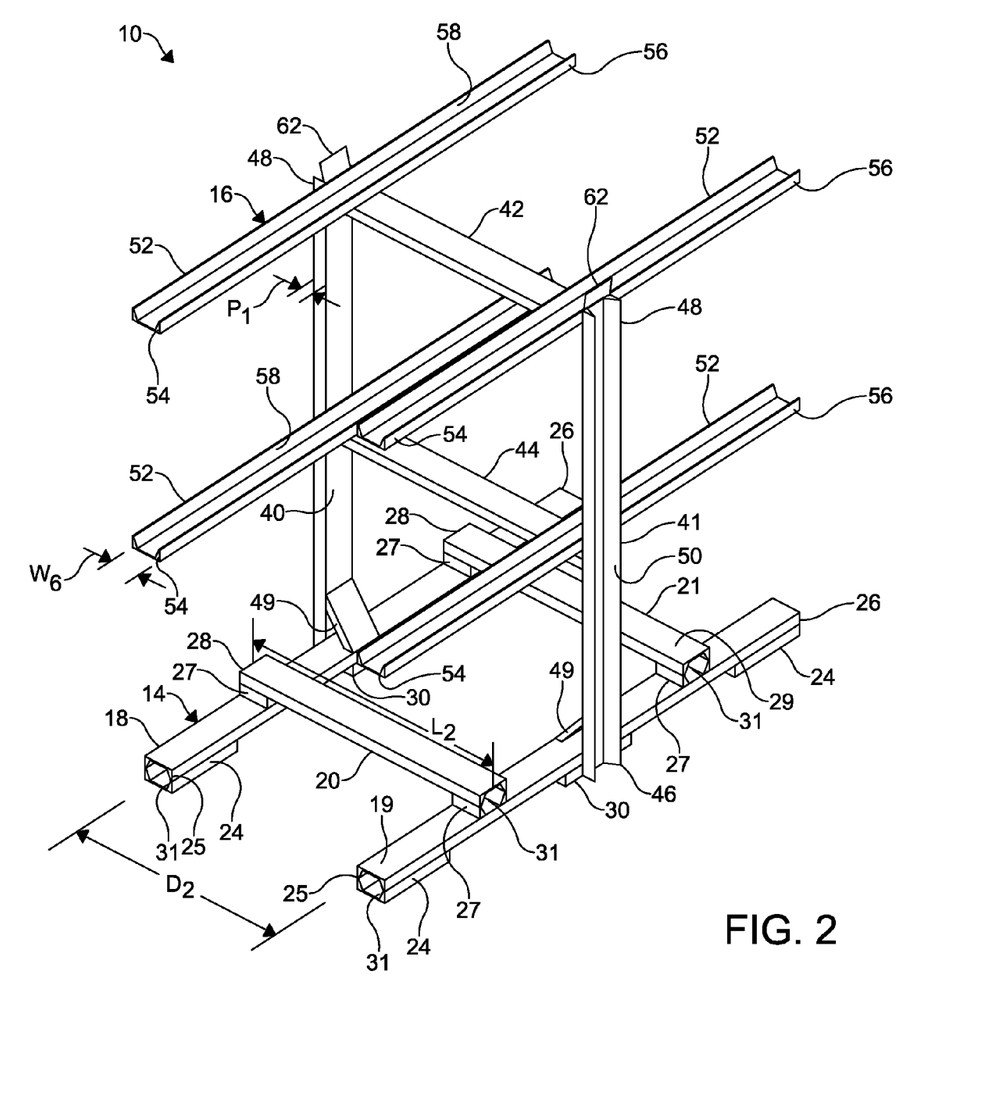
FIG. 2 is a perspective view of the rack apparatus illustrated in FIG. 1.
Figure 3:
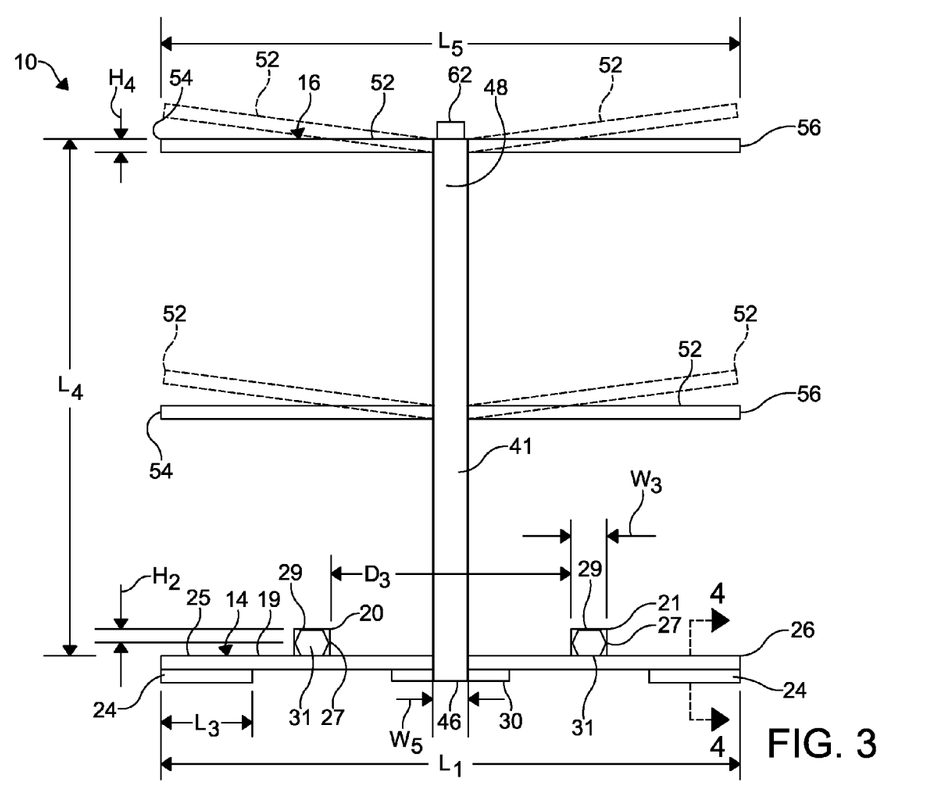
FIG. 3 is a right side elevational view of the rack apparatus illustrated in FIGS. 1-2.

(shown in FIG. 1). It is understood, however, that the rack apparatus 10 may be used in other applications to support and transport various articles and components as desired. The rack apparatus 10 includes a base 14 and a rigid frame 16. In certain embodiments, the base 14 and the frame 16 are configured to cooperate with a base and/or a frame of another rack apparatus (not shown) to allow the rack apparatus 10 to be disposed in a stacked relationship therewith.

Figure 6:
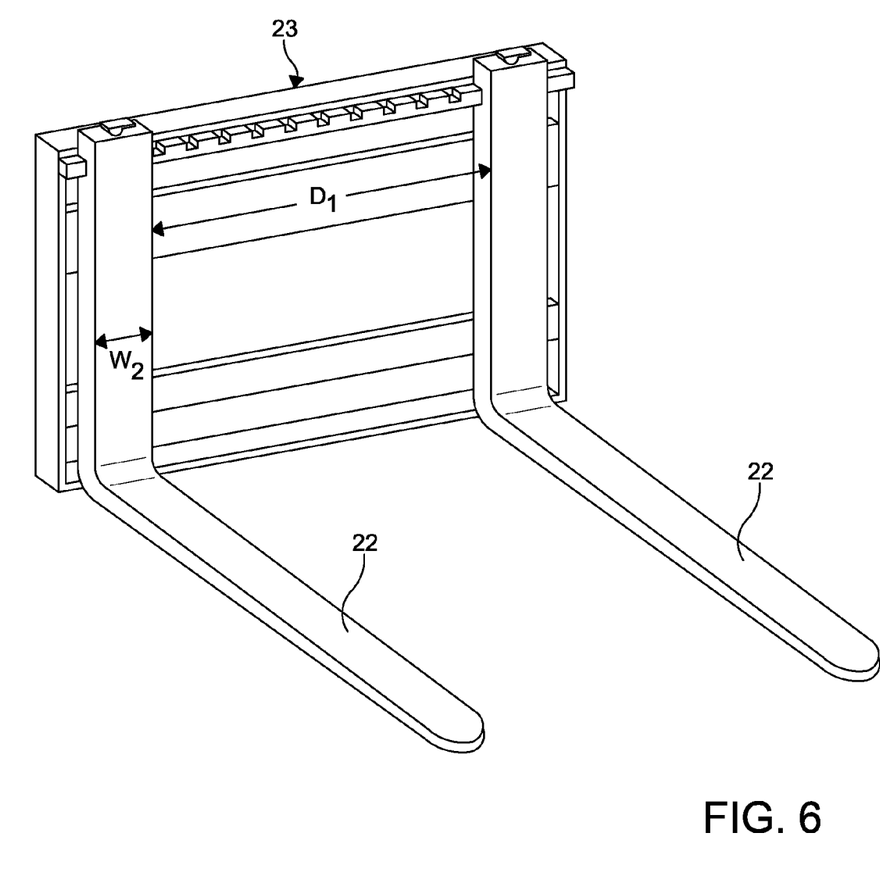
FIG. 6 is a perspective view of a portion of a material handling device used to transport the rack apparatus.

As illustrated, the base 14 includes a pair of spaced apart elongate members 18, 19 having a pair of spaced apart cross members 20, 21 extending therebetween. The elongate members 18, 19 and the cross members 20, 21 are spaced apart with respect to a distance $D_1$ between manipulating components 22 of a material handling device 23 (i.e. forks of a forklift truck shown in FIG. 6). For example, the distance $D_1$ between manipulating components 22 of the material handling device 23 can be spaced apart in a range of about zero inches (0.0") to about seventy-two inches (72"). Thus, the elongate member 18 can be spaced apart from the elongate member 19 at a distance $D_2$ in a range of about zero inches (0.0") to about seventy-two inches (72") and the cross member 20 can be spaced apart from the cross member 21 at a distance $D_3$ in a range of about zero inches (0.0") to about seventy-two inches (72").

In certain embodiments, the distance $D_1$ between manipulating components 22 of the material handling device 23 is spaced apart in a range of about twenty-four inches (24") to about forty-eight inches (48"). Thus, the elongate member 18 is spaced apart from the elongate member 19 at the distance $D_2$ in a range of about twenty-four inches (24") to about forty-eight inches (48") and the cross member 20 is spaced apart from the cross member 21 at the distance $D_3$ in a range of about twenty-four inches (24") to about forty-eight inches (48"). It is understood that each of the elongate members 18, 19 and each of the cross members 20, 21 can be movably coupled another one of the members 18, 19, 20, 21 to permit the distance $D_2$ between the elongate members 18, 19 and the distance $D_3$ between the cross members 20, 21 to be adjusted as desired.

In the embodiments shown in FIGS. 1-3 and 7, the elongate members 18, 19 each have a guide member 24 disposed at a first end 25 and a second end 26, and the members 20, 21 each have a guide member 27 disposed at a first end 28 and a second end 29. The elongate members 18, 19 shown also have a guide member 30 disposed intermediate the first end 25 and the second end 26 thereof. Although the guide members 24, 27, 30 shown are disposed directly underneath the respective members 18, 19, 20, 21, it is understood that at least one of the guide members 24, 27, 30 can be disposed elsewhere on the base 14 as desired such as directly on top of the members 18, 19, 20, 21, for example.

Figure 4:
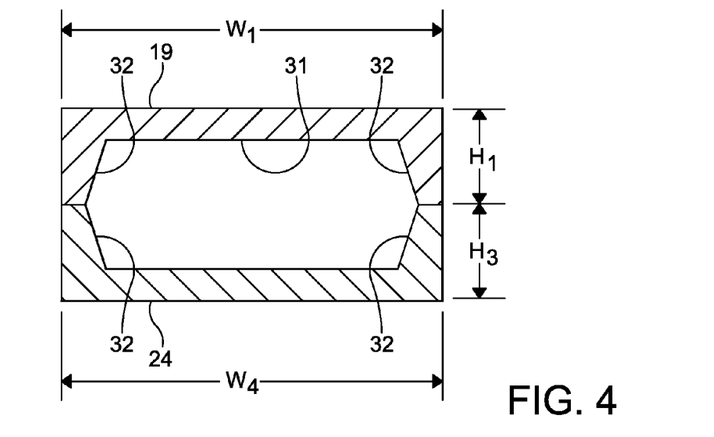
FIG. 4 is a cross-sectional view of an elongate member and corresponding guide member of the rack apparatus illustrated in FIGS. 1-3.

As illustrated, the guide members 24, 27, 30 have a generally U-shaped cross-sectional shape. Each of the members 18, 19, 20, 21 shown also has a generally U-shaped cross-sectional shape. It is understood, however, that each of the guide members 24, 27, 30 and/or the members 18, 19, 20, 21 can have any cross-sectional shape as desired such as elliptical, rectangular, triangular, circular, and the like, or any irregular cross-sectional shape, for example. As illustrated in FIG. 4, the guide members 24, 27, 30 are positioned in respect to the members 18, 19, 20, 21 in such a manner that distal edges of each of the guide members 24, 27, 30 align and cooperate with distal edges of the respective one of the members 18, 19, 20, 21 to define an opening 31 configured to receive one of the manipulating components 22 of the material handling device 23 therein. The guide members 24, 27, 30 are coupled to the members 18, 19, 20, 21 by welding, brazing, use of an adhesive, or any other suitable joining process as desired. Additionally, inner corner web portions 32 (shown in FIG. 4) may be formed to extend along a longitudinal axis of each of the members 18, 19, 20, 21, 24, 27, 30 to enhance a structural integrity and strength thereof.

Figure 5:
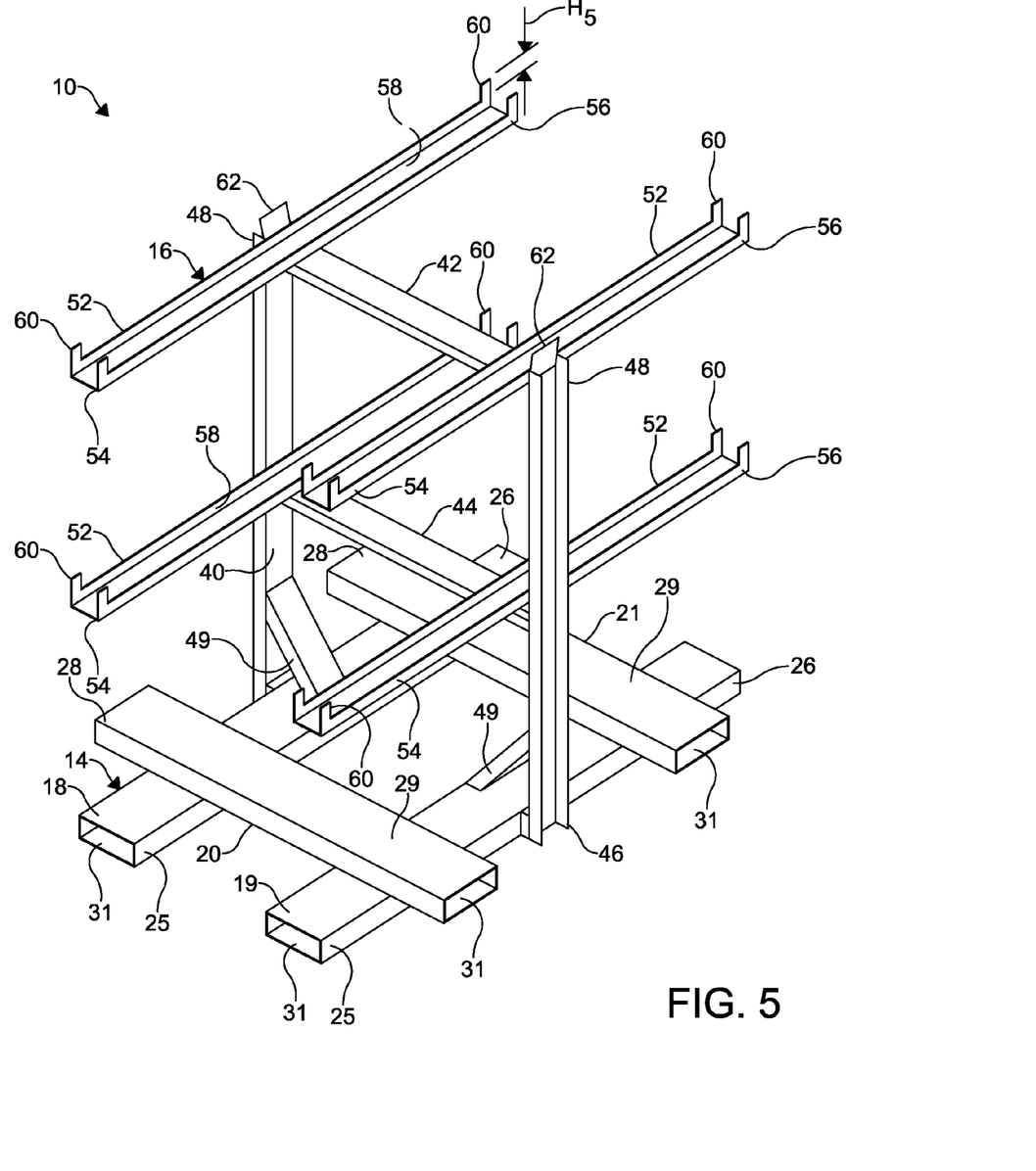
FIG. 5 is a perspective view of a rack apparatus according to another embodiment of the present invention.

In other certain embodiments shown in FIG. 5, the members 18, 19, 20, 21 have a generally rectangular cross-sectional shape, thereby eliminating the need for the guide members 24, 27, 30 to define the opening 31 configured to receive one of the manipulating components 22 of the material handling device 23 therein. It is understood that the members 18, 19, 20, 21 can have other cross-sectional shapes as desired such as square, triangular, circular, elliptical, and the like, or any other irregular shape, for example. It is also understood that each of the members 18, 19, 20, 21 can have any dimensions as desired.

In certain embodiments, each of the elongate members 18, 19 has a length $L_1$ in a range of about seventy-two inches (72") to about ninety-six inches (96"), specifically about eighty-eight inches (88"); a width $W_1$ in a range of about four inches (4") to about twelve inches (12"), specifically about eight inches (8"), depending on a width $W_2$ of each of the manipulating components 22 of the material handling device 23; and a height $H_1$ in a range of about one inch (1") to about five inches (5"), specifically about three and one-half inches (3.5").

In certain embodiments, each of the members 20, 21 has a length $L_2$ in a range of about twenty-four inches (24") to about ninety-six inches (96"), specifically about seventy-six inches (76"), depending on the distance $D_1$ between the manipulating components 22 of the material handling device 23 and/or a distance spanned by tire rings disposed laterally adjacent one another; a width $W_3$ in a range of about four inches (4") to about twelve inches (12"), specifically about eight inches (8"), depending on the width $W_2$ of the manipulating components 22 of the material handling device 23; and a height $H_2$ in a range of about one inch (1") to about five inches (5"), specifically about three and one-half inches (3.5"). As shown in FIG. 5, the ends 28, 29 of each of the members 20, 21 extend laterally outwardly beyond the members 18, 19 to allow the manipulating components 22 of the material handling device 23 to access the openings 31 of the members 20, 21 when the rack apparatus 10 is loaded with the tire rings 12.

In yet other certain embodiments, each of the guide members 24, 27, 30 has a length $L_3$ in a range of about four inches (4") to about eighteen inches (18") depending in part on the width $W_1$, $W_3$ of the respective members 18, 19, 20, 21; a width $W_4$ in a range of about four inches (4") to about twelve inches (12"), specifically about eight inches (8"), depending on the width $W_2$ of the manipulating components 22 of the material handling device 23; and a height $H_3$ in a range of about one inch (1") to about five inches (5"), specifically about three and one-half inches (3.5").

As illustrated, the base 14 includes the frame 16 coupled thereto. The frame 16 includes a pair of spaced apart stanchions or posts 40, 41 having a pair of spaced apart cross members 42, 44 extending therebetween. Each of the stanchions 40, 41 includes a first end 46 and a second end 48. The first end 46 of each of the stanchions 40, 41 is coupled to a corresponding one of the elongate members 18, 19. As shown, the stanchions 40, 41 are fixedly coupled to the elongate members 18, 19 intermediate the first end 25 and the second end 26 thereof and adjacent to the guide members 30. A support member 49 may be disposed between each of the stanchions 40, 41 and the corresponding one of the elongate members 18, 19 to enhance a structural integrity and strength of the frame 16.

Figure 7:
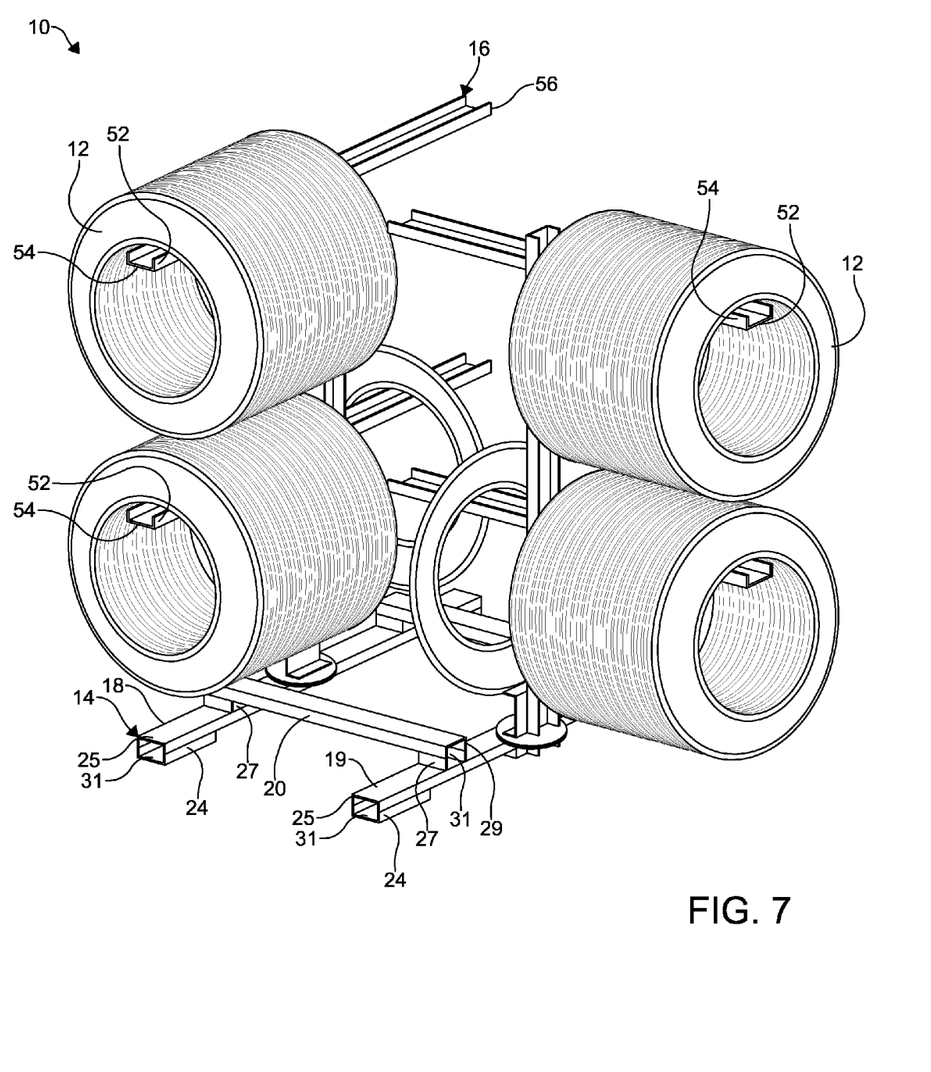
FIG. 7 is a perspective view of a rack apparatus according to another embodiment of the present invention.

The stanchions 40, 41 and the support members 49 shown have a generally U-shaped cross-sectional shape. It is understood, however, that the stanchions 40, 41 and the support members 49 can have any shape and size as desired. Additionally, inner corner web portions 50 may be formed to extend along a longitudinal axis of each of the stanchions 40, 41 and the support members 49 to enhance a structural integrity and strength thereof. The stanchions 40, 41 are coupled to the members 18, 19, 49 by welding, brazing, use of an adhesive, or any other suitable joining process as desired. Alternatively, as shown in FIG. 7, the cross members 42, 44 may be eliminated and the stanchions 40, 41 may be rotatably coupled to the respective elongate members 18, 19 to permit insertion and removal of the tire rings 12 from a plurality of sides of the rack apparatus 10, if desired. In certain embodiments, each of the stanchions 40, 41 has a length $L_4$ in a range of about sixty inches (60") to about ninety-six inches (96"), specifically about eighty-six inches (86"); a width $W_5$ in a range of about four inches (4") to about twelve inches (12"), specifically about eight inches (8"); and a depth $P_1$ in a range of about one inch (1") to about three inches (5"), specifically about three and one-half inches (3.5").

An array of receiving members 52 are coupled to the stanchions 40, 41 extending laterally outwardly therefrom. The receiving members 52 are spaced apart with respect to one another in any manner as desired. For example, the receiving members 52 may be spaced apart with respect to one another in such a manner as to permit the tire rings 12 disposed thereon to be positioned beside each other and/or above or below each other as shown in FIG. 1. A spacing between the upper receiving members 52 and the lower receiving members 52 is greater than a spacing between the lower receiving members 52 and the base 14 to facilitate easier removal of the tire rings 12 from the upper receiving members 52.

Each of the receiving members 52 includes a first end 54 and a second end 56. As illustrated, a portion of the receiving members 52 intermediate the first end 54 and the second end 56 is coupled to at least one of the stanchions 40, 41 and/or the cross members 42, 44. As shown in dashed lines in FIG. 3, at least one of the receiving members 52 may be disposed on the stanchions 40, 41 such that the ends 54, 56 of the receiving members 52 are angled upward away from the base 14, to militate against disengagement of the tire rings 12 from the rack apparatus 10 during use and transportation thereof.

In certain embodiments, the receiving members 52 have a generally U-shaped cross-sectional shape to receive the manipulating component 22 of the material handling device 23 therein. It is understood, however, that the receiving members 52 can have any shape and size as desired. Additionally, inner corner web portions 58 may be formed to extend along a longitudinal axis of each of the receiving members 52 to enhance a structural integrity and strength thereof. The receiving members 52 are coupled to the stanchions 40, 41 and/or the cross members 42, 44 by welding, brazing, use of an adhesive, or any other suitable joining process as desired. Alternatively, the receiving members 52 may be rotatably coupled to the stanchions 40, 41 and/or the cross members 42, 44 to permit insertion and removal of the tire rings 12 from a plurality of sides of the rack apparatus 10, if desired.

In certain embodiments, each of the receiving members 52 has a length $L_5$ in a range of about seventy-two inches (72") to about ninety-six inches (96"), specifically about eighty-eight inches (88"); a width $W_6$ in a range of about four inches (4") to about twelve inches (12"), specifically about eight inches (8"), depending on the width $W_2$ of the manipulating components 22 of the material handling device 23; and a height $H_4$ in a range of about one inch (1") to about five inches (5"), specifically about three and one-half inches (3.5"). It is understood, however, that the receiving members 52 can have any suitable shape and size to accommodate tire rings 12 of various sizes or other articles and components, if desired. The receiving members 52 of the rack apparatus 10 shown provides for the transport and storage of eight (8) groupings of twenty-five (25) tire rings. However, the receiving members 52 may be configured to permit the width and the length thereof to be adjustable, either manually, automatically, or semi-automatically, to more easily accommodate different sized and numbers of tire rings 12, articles, and components.

At least one stop tab 60 (shown in FIG. 5) may be disposed on at least one of the first end 54 and the second end 56 of the receiving members 52 to militate against an undesired displacement of the tire rings 12 from the receiving members 52, especially during transport of the rack apparatus 10. The tabs 60 also facilitate removal of the tire rings 12 from the manipulating components 22 of the material handling device 23 during loading of the tire rings 12 onto the rack apparatus 10. Further, an alignment tab 62 may be disposed on the second end 48 of at least one of the stanchions 40, 41 to facilitate an alignment and retention of another rack apparatus in the stacked relationship with the rack apparatus 10. In certain embodiments, the alignment tab 62 cooperates with a first end of the stanchions of another rack apparatus to facilitate the alignment and retention of the rack apparatus. In certain embodiments, each of the tabs 60, 62 has a height $H_5$ of about two inches (2"). The tabs 60, 62, however, can have any shape and size as desired.

It is understood that the base 14 and the frame 16 of the rack apparatus 10 can be formed from any suitable material such as steel, stainless steel, aluminum, plastic, and the like, for example. In certain embodiments, the elongate members 18, 19; the cross members 20, 21; the guide members 24, 27, 30; the stanchions 40, 41; the cross members 42, 44; the supports members 49; and the receiving members 52 are formed from at least one of an eight inch (8") web steel or an eight inch (8") rectangular tube steel.

In operation of certain embodiments of the present invention, the tire rings 12 are loaded onto the receiving members 52 of the rack apparatus 10 either manually or using the manipulating components 22 of the material handling device 23. When the material handling device 23 is used to load the tire rings 12, the tire rings 12 are disposed on each of the manipulating components 22 thereof. The manipulating components 22 are then aligned and caused to travel in a first direction within a channel formed in the receiving members 52 until all of the tire rings 12 are positioned onto the receiving members 52. The manipulating components 22 are then moved in a downward direction and caused to travel in an opposite second direction within the channel of the receiving members 52 until the manipulating components 22 are completely removed therefrom. As the manipulating components 22 are removed from the channel of the receiving members 52, the tabs 60 facilitate removal of the tire rings 12 from the manipulating components 22 and militate against inadvertent disengagement of the tire rings 12 from the rack apparatus 10. Once the tire rings 12 are loaded onto the rack apparatus 10, the manipulating components 22 are then aligned and inserted into the respective openings 31 of the members 18, 19 or the members 20, 21. The rack apparatus 10 is then transported using the material handling device 23 to any desired location for storage and/or use.

When use of the tire rings 12 is desired, the rack apparatus 10, loaded with the tire rings 12, is transported to a desired location where the tire rings 12 are unloaded and removed from the receiving members 52 either manually or by using the manipulating components 22 of the material handling device 23. When the material handling device 23 is used to unload the tire rings 12, the manipulating components 22 thereof are aligned and caused to travel in the first direction within the channel formed in the receiving members 52 until all of the tire rings 12 are positioned onto the manipulating components 22. The manipulating components 22, loaded with the tire rings 12, are then moved in an upward direction so that the tire rings 12 avoid contact with the tabs 60. Thereafter, the manipulating components 22 are caused to travel in an opposite second direction along the receiving members 52 until the manipulating components 22 are completely removed therefrom. The material handling device 23 then transports the tire rings 12 to the desired location. After the tire rings 12 are removed, the rack apparatus 10 can be transported using the material handling device 23 to another desired location for storage and/or use.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A rack apparatus, comprising:
   a base including a plurality of spaced apart elongate members, a plurality of cross members coupled to at least one of the elongate members, at least one first guide member coupled to at least one of the elongate members, and at least one second guide member coupled to at least one of the cross members, wherein each of the elongate members is configured to cooperate with a manipulating component of a material handling device; and
   a frame coupled to the base, wherein the frame includes at least one stanchion having at least one receiving member disposed thereon, the at least one receiving member configured to removably receive at least one tire ring thereon and at least a portion of the manipulating component of the material handling device in an open end thereof.

2. The rack apparatus of claim 1, wherein at least one of the elongate members has one of a generally U-shaped cross-sectional shape and a generally rectangular cross-sectional shape.

3. The rack apparatus of claim 1, wherein the at least one first guide member has a generally U-shaped cross-sectional shape.

4. The rack apparatus of claim 1, wherein at least one end of at least one of the elongate members cooperates with the at least one first guide member to define an opening configured to receive the manipulating component of the material handling device.

5. The rack apparatus of claim 1, wherein at least one of the cross members has one of a generally U-shaped cross-sectional shape and a generally rectangular cross-sectional shape.

6. The rack apparatus of claim 1, wherein the cross members are spaced apart to cooperate with manipulating components of the material handling device.

7. The rack apparatus of claim 1, wherein the at least one second guide member has a generally U-shaped cross-sectional shape.

8. The rack apparatus of claim 1, wherein at least one end of at least one of the cross members cooperates with the at least one second guide member to define an opening configured to receive the manipulating component of the material handling device.

9. The rack apparatus of claim 1, wherein the at least one stanchion is configured to couple the at least one receiving member to the base.

10. The rack apparatus of claim 9, wherein the at least one stanchion is rotatably coupled to the base.

11. The rack apparatus of claim 9, wherein at least one of the at least one receiving member and the at least one stanchion includes a tab disposed thereon.

12. The rack apparatus of claim 1, wherein the at least one receiving member has a generally U-shaped cross-sectional shape.

13. A rack apparatus, comprising:
   a base including a plurality of spaced apart elongate members, a plurality of cross members coupled to at least one of the elongate member, at least one first guide member coupled to at least one of the elongate members, and at least one second guide member coupled to at least one of the cross members, wherein each of the elongate members is configured to cooperate with a manipulating component of a material handling device; and
   a frame coupled to the base, wherein the frame includes at least one stanchion having at least one receiving member disposed thereon, the at least one receiving member configured to removably receive at least one tire ring thereon and at least a portion of the manipulating component of the material handling device in an open end thereof, and wherein the frame is configured to receive another rack apparatus thereon in stacked relationship.

14. A method of transporting a tire ring, comprising the steps of:
   providing a rack apparatus including a base having a plurality of elongate members, a plurality of cross members coupled to at least one of the elongate members, at least one first guide member counted to at least one of the elongate members, and at least one second guide member coupled to at least one of the cross members, and a frame coupled to the base, wherein the frame includes at least one receiving member configured to removably receive the tire ring thereon and at least a portion of a manipulating component of a material handling device in an open end thereof; and
   causing the rack apparatus to move from a first desired position to a second desired position using the material handling device.

15. The method of transporting the tire ring of claim 14, wherein the elongate members are spaced apart to cooperate with manipulating components of the material handling device.

16. The method of transporting the tire ring of claim 14, wherein the cross members are spaced apart to cooperate with manipulating components of the material handling device.

17. The method of transporting the tire ring of claim 14, wherein the at least one receiving member has a generally U-shaped cross-sectional shape.

* * * * *